United States Patent [19]

Matsukata

[11] 4,123,064

[45] Oct. 31, 1978

[54] PREDETERMINED INDEX GAUGE FOR LOCATING A SELECTED RECORD BAND ON A GRAMAPHONE RECORD

[76] Inventor: Kosuke Matsukata, 390 Tsurumi-cho, Tsurumi-ku, Yokohama, Kanagawa-ken, Japan

[21] Appl. No.: 800,034

[22] Filed: May 24, 1977

[30] Foreign Application Priority Data

May 26, 1976 [JP] Japan ................................ 51-60159

[51] Int. Cl.² .............................................. G11B 3/00
[52] U.S. Cl. .................................. 274/1 R; 274/9RA
[58] Field of Search ................... 274/9 RA, 13 R, 14, 274/15 R, 20, 21, 1 R

[56] References Cited

U.S. PATENT DOCUMENTS

| | | | |
|---|---|---|---|
| 1,792,528 | 2/1931 | Bleyer | 274/1 R |
| 2,092,761 | 9/1937 | Klein | 274/1 R |
| 2,243,126 | 5/1941 | Routin | 274/14 |
| 2,256,579 | 9/1941 | Routin | 274/14 |
| 3,934,884 | 1/1976 | Matsukata | 274/9 RA |

*Primary Examiner*—Charles E. Phillips
*Attorney, Agent, or Firm*—Eyre, Mann, Lucas & Just

[57] ABSTRACT

Method of making an index gauge based on a portion of a generally available record to be used for a generally comb shaped apparatus having a slot on one end to engage the center spindle of a record player and having an index gauge that engages a tone arm, to help position the tone arm to select a particular song or narration from a record album.

3 Claims, 19 Drawing Figures

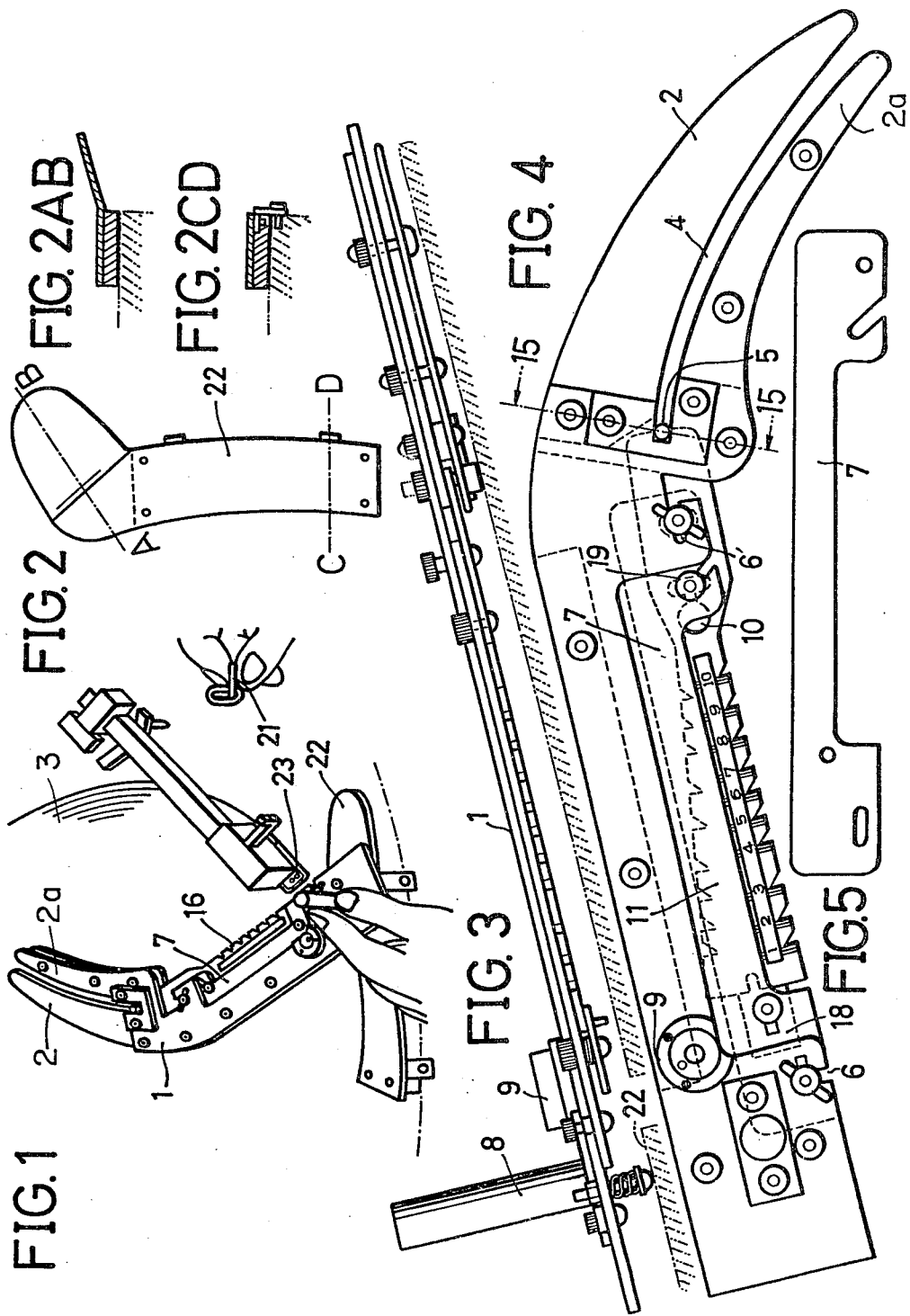

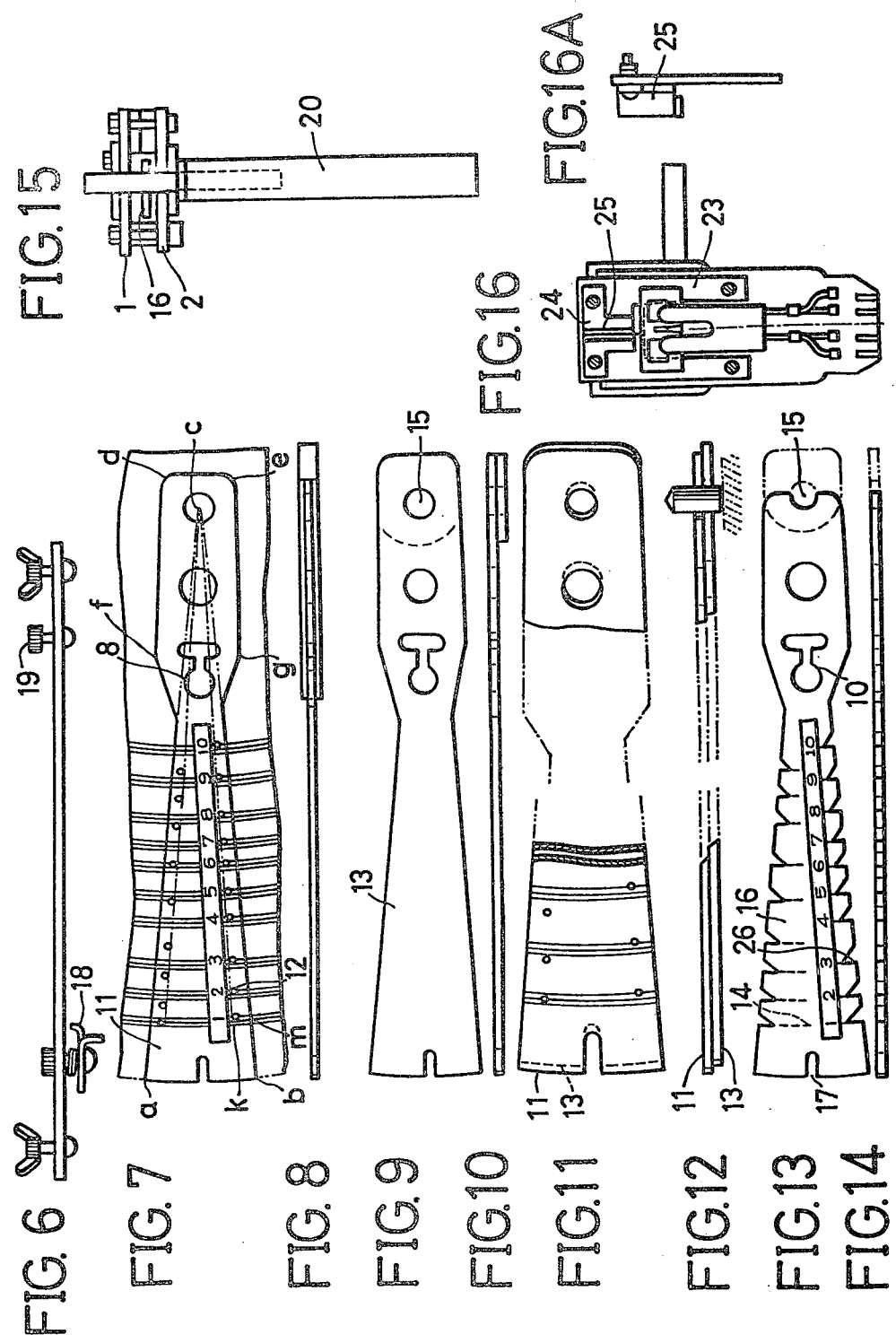

PREDETERMINED INDEX GAUGE FOR LOCATING A SELECTED RECORD BAND ON A GRAMAPHONE RECORD

BACKGROUND OF THE INVENTION

This invention relates to predetermined index gauges for locating a selected recorded band on a phonograph record carrying a plurality of such bands and the method of making thereof.

Apparatus for indexing a plurality of bands on a long playing phonograph is now disclosed in applicant's U.S.A. and United Kingdom Pat. Nos. 3,934,884 and 1,472,771 respectively. In the basic patents, the dimensions of a stylus needle setter is made independent of the central spindle of a turn table. It is now found that the relationship between the stylus of the tone arm and the central spindle of a turn table is very delicate one and that adjustment of this relationship at the time of each playing causes tremendous effort in obtaining correct adjustment. To overcome this difficulty, an independent index gauge providing a predetermined relationship between the central spindle and the stylus needle setter is now provided. The index gauge is inserted into band selector proper.

SUMMARY OF THE INVENTION

A pattern for a predetermined index gauge is cut from a sample record in suitable shape to be later used to mark a master index gauge. The location of last line of each lead in groove to recorded music or naration, is pin holed on the pattern. The pattern and the blank master band gauge are stacked on a spindle. The pinhole positions are then to blank master index gauge through this pin hole by drawing a guide arc using a pointed pin through each pin hole and turning the pattern about the spindle. Triangular notches are cut in the edge of master index gauge using the guide arcs to define one, base of each triangular notch. A guide attachment on the cartridge of a tone arm is engaged in turn with each triangular notch in the master index gauge using a gramaphone record stamped from the same master as the record from which the master index gauge was cut with band selector. If the tone arm satisfactorily finds the lead groove in each recorded band, the master index gauge is now ready for use as a master for forming a stamper of finished resin index gauge to be marketed with each record. Precision achieved with this band selector can be favourablly compared with machine made on a computer logic circuit operated with infrared beam sensor because in some record the lead-in groove is minute, and the sensor is unable to sense the lead-in groove while in the machine of this invention, no difficulty is encountered to play the required bands with the prepared index gauge.

In the preferred embodiment, the disclosure teaches use in a phonograph record band selector comprising:

(a) shaping an index gauge pattern from a phonograph record having a plurality of recorded bands separated by at least one lead-in groove, said pattern including at least the spindle hole and a radial strip of said phonograph record;

(b) pin pricking through said pattern at each of said at least one lead-in groove;

(c) placing a blank master index gauge having a spindle hole therein onto a spindle;

(d) stacking said pattern on said spindle atop said blank master index gauge;

(e) transferring said pin pricking through said pattern onto said master index gauge by rotating said pattern above said master index gauge with marking means extending through said pin prickings whereby registered arcuate lines are marked on said master index gauge;

(f) cutting said blank index gauge a predetermined distance along each of said arcuate lines;

(g) cutting said blank index gauge with cuts which intersect the cuts along said arcuate lines; and (h) cutting through two sides of said spindle hole in said master index gauge.

This following is a description of one embodiment of the invention, reference being made to the accompanying drawings in which:

FIG. 1 shows a perspective view of a tone arm with tone arm actuator held by right hand fingers and a band selector having a column handle held by left hand fingers the, band selector being on the record player with its central spindle in an arcuate opening of the band selector, the end of which is slideably held on a leveling platform.

FIGS. 2, 2AB and 2CD show plan views of the leveling platform, and two sections at two positions.

FIG. 3 shows a side view of the band selector lying on a record and leveling platform.

FIG. 4 shows a plan view of FIG. 3

FIG. 5 shows a plan view of gauge holder carrier

FIG. 6 shows a side view of the FIG. 5

FIG. 7 shows a plan view of the index gauge to be cut from a record

FIG. 8 shows a side view of FIG. 7

FIG. 9 shows a plan view of blank master index gauge

FIG. 10 shows a side view of FIG. 9

FIG. 11 shows a plan view of a pin holed index gauge on top of a blank master index gauge FIG. 12 shows a side view of FIG. 11

FIG. 13 shows a plan view of a master index gauge with its end cut through

FIG. 14 shows a side view of FIG. 13

FIG. 15 shows a sectional view of the band selector of FIG. 4 along, line 15—15 of FIG. 4 with a central spindle jig.

FIG. 16 shows a general bottom view of a cartridge having a locating apparatus mounted on it.

FIG. 16A shows a side view of the attachment to the cartridge end to provide a vertical counter face against the index gauge cut out.

Referring to FIG. 14, the present invention teaches the making of an index gauge 11 for use with a precision piece selector of the type described in detail in U.S. Pat. No. 3,934,884, herein incorporated by reference. Briefly, a pair of jaws 2, 2a attached to a handle 1 define between them an arched opening 4 into which the central spindle 5 of a phonograph turntable 3 may be fitted. With the throat of the arced opening 4 seated against the central spindle 5, cut outs in the edge of the index gauge 11 are located at precisely fixed radii over the turntable 3. A guide 25 (FIGS. 16, 16a) on the tone arm engages a selected one of the cut outs to accurately position the stylus over the desired lead-in groove. Further details of the prior art device may be obtained from the referenced patent.

Reference will now be made to FIGS. 5 through 15. The index gauge pattern 11 has the following dimensions.

a – b: 35mm – 20mm d − e, f − g: 25mm
d − f, e − g 65mm
k − m: 3mm

This size of index gauge pattern is cut from an available record as shown in FIG. 7. Between bands, there exist lead-in grooves measuring from 0.3(31 minute playing) to 0.6(23 minute playing) mm for a 30cm record. At the last line of each lead-in groove before the music or narration starts a, pin hole 12 is pricked through for each band by a marking-off pin through using a magnifying lens (not shown). Each pin hole 12 is now transfered to a blank master index gauge 13 on which is fitted on the spindle of a turntable as shown in FIG. 12. The pattern 11 is fitted on the spindle over the blank master index gauge and the pin hole locations are marked through each pin hole 12 along guide line kc, on the pattern 11 by a pointed pin as shown in FIG. 13 on blank master index gauge 13. The pattern 11 is rotated on the central spindle to mark a base line 14 on the blank master index gauge 13. The blank master index gauge 13 is cut along base lines to form triangular notches for each band. The central spindle hole 15 of blank master index gauge 13 is generally closely fitted to central spindle 5.

Since the available record's central spindle hole is a loose fit on the spindle, when blank master index gauge 13 is placed underneath the pattern 11, a gap is found between two as shown FIGS. 11, 12. To overcome this, pattern 11 is biased outwardly to blank index gauge as shown in FIG. 12. To complete the blank master index gauge 13, to be formed into a master index gauge 16 its top portion must be cut as shown in full line in FIG. 13 so that central spindle 5 can be inserted sidewardly into the band selector. After this, the blank index gauge 13 is called master index gauge 16. Lengthwise narrow cut 17 at the bottom end is used to take metal piece 18 slidably attached to index gauge carrier 7. Hole 10 is used when bolt 19 as shown in FIG. 6 is used to join master index gauge 16 and index gauge carrier 7 before the carrier 7 is fitted to the band selector.

In operation, a central spindle jig 20 of FIG. 15 is employed to fix master index gauge 16 to the band selector as shown. An improvement over the referenced patent provides a levelling, platform 22 against which handle 1 may be engaged to maintain its level during operation. To confirm the level condition of the band selector on the record, level means 9 is provided on handle 1 at its end portion shown FIGS. 3 and 4.

In FIGS. 16 and 16A, location attachment of a resin sheet 23 to the cartridge in the plug-in-head of the tone arm so shown. Metal piece 24 is further attached thereto to provide guide side 25 which contacts cut outs 26 of the master index gauge when the band selector is in operation on the record.

What I claim is:

1. A method for forming a master index gauge for use in a phonograph record band selector comprising:
   (a) shaping an index gauge pattern from a phonograph record having a plurality of recorded bands separated by at least one lead-in groove, said pattern including at least the spindle hole and a radial strip of said phonograph record;
   (b) pin pricking through said pattern at each of said at least one lead-in groove;
   (c) placing a blank master index gauge having a spindle hole therein onto a spindle;
   (d) stacking said pattern on said spindle atop said blank master index gauge;
   (e) transferring said pin pricking through said pattern onto said master index gauge by rotating said pattern above said master index gauge with marking means extending through said pin prickings whereby registered arcuate lines are marked on said master index gauge;
   (f) cutting said blank index gauge a predetermined distance along each of said arcuate lines;
   (g) cutting said blank index gauge with cuts which intersect the cuts along said arcuate lines; and
   (h) cutting through two sides of said spindle hole in said master index gauge.

2. The method in claim 1 further comprising:
   (a) marking at least one radial line on said pattern; and
   (b) positioning said pin pricking along said at least one radial line.

3. The method in claim 1 further comprising:
   (a) pin pricking a second set of pin prickings through said pattern at each lead-in groove on the second side of said phonograph record;
   (b) transferring said second set of pin prickings to said blank master index gauge whereby a second set of arcuate lines are marked thereon;
   (c) cutting said blank index gauge a predetermined distance along each of said second set of arcuate lines; and
   (d) cutting said blank index gauge with cuts which intersect the cuts along said second set of arcuate lines.

* * * * *

UNITED STATES PATENT AND TRADEMARK OFFICE
CERTIFICATE OF CORRECTION

PATENT NO. : 4,123,064
DATED : October 31, 1978
INVENTOR(S) : Kosuke Matsukata

It is certified that error appears in the above-identified patent and that said Letters Patent are hereby corrected as shown below:

Column 1, line 34, insert after "then" --transferred--.

Column 2, line 19, "the," should read --,the--.

Column 2, line 55, "arched" should read --arced--.

Column 3, line 9, "a," should read --,a--.

Column 3, line 12, "on" should be deleted.

Signed and Sealed this

Twentieth Day of February 1979

[SEAL]

Attest:

RUTH C. MASON
Attesting Officer

DONALD W. BANNER
Commissioner of Patents and Trademarks